United States Patent
Kappes et al.

(10) Patent No.: US 6,709,255 B2
(45) Date of Patent: Mar. 23, 2004

(54) NOZZLE ARRANGEMENT, NOZZLE HOLDER AND DEVICE FOR EXTRUDING DOUGH MATERIALS

(75) Inventors: Holger Kappes, Heilbronn (DE); Günther Fux, Güglingen (DE); Frank Altvater, Heilbronn (DE)

(73) Assignee: Hosokawa Bepex GmbH, Leingarten (DE)

( * ) Notice: Subject to any disclaimer, the term of this patent is extended or adjusted under 35 U.S.C. 154(b) by 68 days.

(21) Appl. No.: 10/059,528

(22) Filed: Jan. 29, 2002

(65) Prior Publication Data

US 2002/0081345 A1 Jun. 27, 2002

Related U.S. Application Data

(63) Continuation of application No. PCT/EP00/07553, filed on Aug. 3, 2000.

(30) Foreign Application Priority Data

Aug. 5, 1999 (DE) .......................... 199 36 828

(51) Int. Cl.⁷ .............................. B29C 47/26
(52) U.S. Cl. .................. 425/133.1; 425/192 R; 425/319; 425/381; 425/462; 425/466
(58) Field of Search .................. 425/133.1, 192 R, 425/319, 381, 462, 466

(56) References Cited

U.S. PATENT DOCUMENTS

| | | |
|---|---|---|
| 2,532,131 A | 11/1950 | Van Voorst |
| 4,574,690 A | 3/1986 | Chiao et al. |
| 4,859,165 A | 8/1989 | Hoashi |
| 4,900,572 A | 2/1990 | Repholz et al. |
| 5,120,554 A | 6/1992 | Farnsworth et al. |
| 5,518,749 A | 5/1996 | Weinstein |
| 5,670,185 A | 9/1997 | Heck et al. ............... 425/133.1 |

FOREIGN PATENT DOCUMENTS

| | | |
|---|---|---|
| EP | 0168255 A2 | 1/1986 |
| EP | 0177175 A2 | 4/1986 |
| EP | 0287209 A2 | 10/1988 |
| EP | 0434983 A1 | 7/1991 |
| EP | 0704158 A1 | 4/1996 |
| WO | WO 9639039 | 12/1996 |
| WO | WO 9725881 | 7/1997 |

*Primary Examiner*—Robert Davis
*Assistant Examiner*—Joseph S Del Sole
(74) *Attorney, Agent, or Firm*—Clifford W. Browning; Woodard, Emhardt, Moriarity, McNett & Henry LLP

(57) ABSTRACT

In order to manufacture coiled baking articles with at least one outer dough material (58) and with at least one inner dough material (56) or dough filling, a nozzle arrangement (10) comprises an inner stationary nozzle (14) and an outer nozzle (18) rotatably enclosing the inner nozzle (14). A mouth (20) of the outer nozzle (18) is arranged behind the mouth (16) of the inner nozzle (14) in the direction of flow in such a manner that the materials flow together at the mouth (16) of the inner nozzle (14) and on the path to the mouth (20) of the outer nozzle (18) the inner material (56) is set in rotation by the outer material (58) and is thereby compressed.

8 Claims, 2 Drawing Sheets

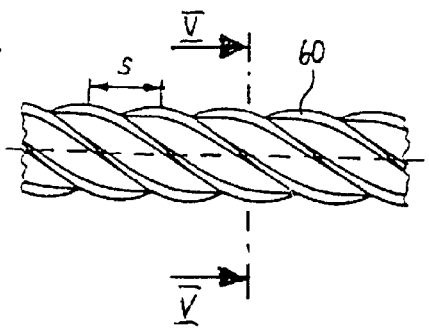
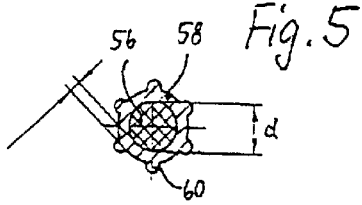
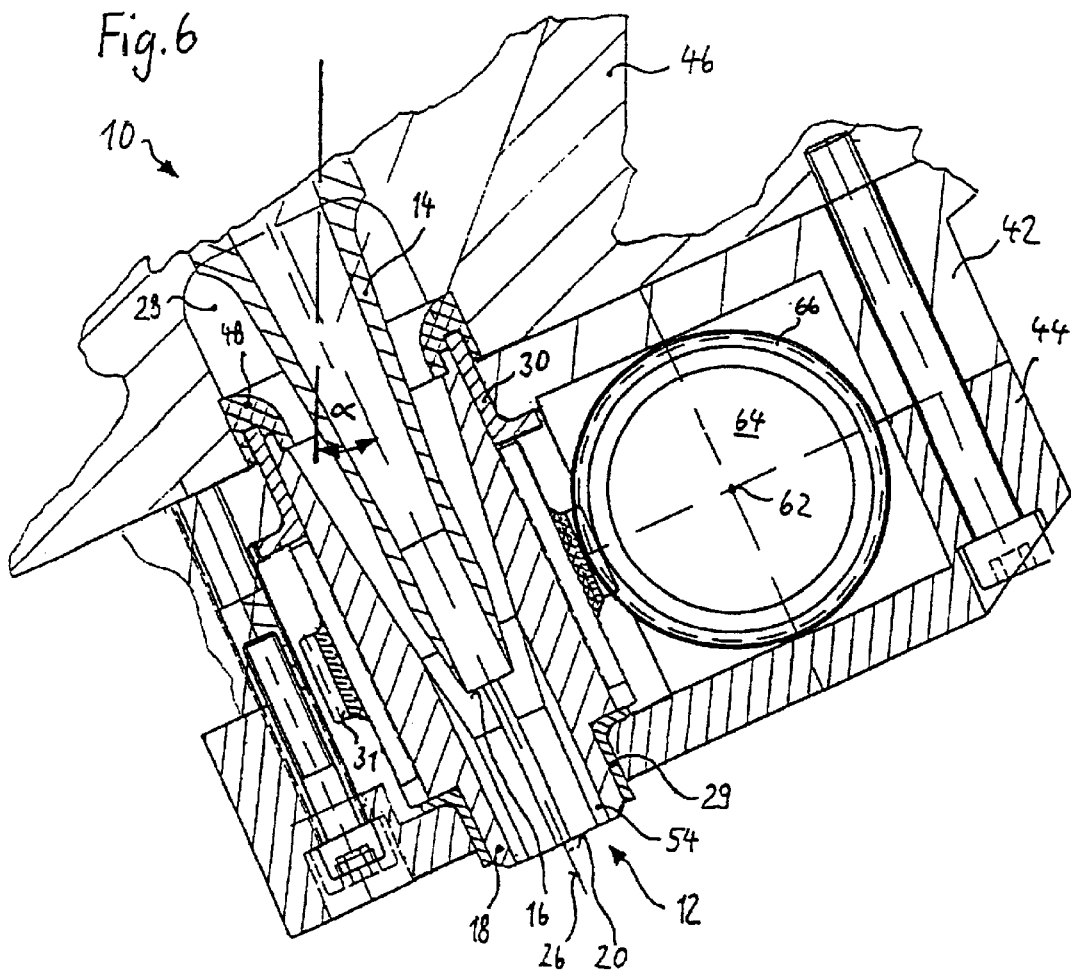

NOZZLE ARRANGEMENT, NOZZLE HOLDER AND DEVICE FOR EXTRUDING DOUGH MATERIALS

This is a continuation of Application No. PCT/EP00/07553, filed Aug. 3, 2000.

The invention relates to a nozzle arrangement, a nozzle holder and a device for extruding dough materials using the nozzle holder.

BACKGROUND OF THE INVENTION

Baking articles, doughs and confectionery are often extruded by squeezing material under pressure through a nozzle arrangement to form a strand. As such, the strand may be carried away by a conveyor belt or cut into short sections. The outer shape of the strand, in particular its circumferential shape, is dependent upon the nozzle arrangement.

A nozzle arrangement is known from EP-A-0 704 158 with an inner stationary nozzle, which is enclosed by two outer nozzles rotatably mounted in a rotor. The inner nozzle extends in the direction of flow beyond the mouth of the outer nozzle or is extended beyond said mouth by a tube rotating together with the rotor. A connection of the inner material with the outer material is only inadequately ensured using a nozzle arrangement of this type.

Devices are known from EP-A-0 168 255 and EP-A-0 177 175 for co-extruding two materials, which extrude an inner material through a nozzle and an outer material with grainy particles contained therein through a funnel enclosing the nozzle, the materials being combined to form a strand. At its mouth, the funnel comprises sharp edges, so that the grainy particles in the outer material reach the surface. The mouth of the funnel may be toothed, so that the particles project from the surface. The composite strand is carried away by a conveyor belt. In this manner, a baking article can be produced from two materials having a linear, longitudinal shape with grainy particles on the surface.

U.S. Pat. No. 5,120,554 describes a free-standing nozzle head for extruding a dough material. On its circumference, the nozzle head has a plurality of nozzle arrangements, which are formed in each case by a double nozzle in order to produce filled baking articles. These double nozzles each comprise an inner nozzle, which is supplied by an individual feed duct, and an outer nozzle. The outer nozzles are supplied via a common cylindrical feed chamber through lateral ducts. The nozzle head allows for the simultaneous extrusion of a plurality of filled, straight strands.

A method and a device for producing twisted cereal products are known from U.S. Pat. No. 5,518,749 and WO 97/25881. A rotor, which extends through a chamber and opens out into an opening of the chamber, forms an inner nozzle, through which an inner material can be supplied. A second material can be supplied to the chamber through a side duct. Formed between the opening of the chamber and the rotor is an annular gap, through which the second material can emerge. The annular gap corresponds to an outer nozzle. When the inner nozzle rotates, a product is formed with a twisted outer material layer and a filling. In this respect, the twisting of the outer material layer is closely dependent upon the properties of the outer material, such as flow behaviour and viscosity, for example. The extruded cereal products do not therefore always have a sufficiently uniform shape.

SUMMARY OF THE INVENTION

It is the object of the invention to provide a nozzle arrangement, a nozzle holder and a device for extruding dough materials, by means of which it is possible to manufacture twisted or coiled baking articles with at least one outer material and with at least one inner material or filling with a high degree of shape accuracy.

This object is attained according to the invention by a nozzle arrangement described below. Accordingly, during extrusion the rotary movement of the outer nozzle is superimposed over the longitudinal movement of the extruded material in the inner nozzle, so that an externally coiled baking article with a filling is produced. In this respect, the materials flow together at the mouth of the inner nozzle. According to the invention, this mouth is set back behind the mouth of the outer nozzle in relation to the direction of flow of the material. On its path from the mouth of the inner nozzle to the mouth of the outer nozzle, the inner material is set in rotation by the outer material and is thereby compressed. In this manner, a secure bond between the inner and outer materials is obtained. In the resulting baking articles, the coupling of the outer material to the inner material is therefore improved.

As a result of the design of the mouth of the outer nozzle, during extrusion the material emerges through the substantially longitudinally oriented recesses, e.g. longitudinal grooves, and forms one or more coiled webs on the curved surface of the cylindrical baking article. The shape and number of the said web or webs can be varied to a wide degree by the shape and number of the recesses.

Particularly suitable for driving the nozzle holder is a traction gearing, more particularly a toothed belt drive, or a toothed wheel gearing with crossing axes, it being possible in a special construction to drive a plurality of nozzle holders simultaneously.

It is provided in a preferred embodiment of the invention that the nozzle holder(s) is/are arranged inclined at an angle α of approximately 25° to the vertical. As a result of the inclined nozzle holder, the emerging material arrives at an angle on a support, for example a conveyor belt, and is therefore less deformed during the further movement than would be the case if the material were to emerge vertically.

BRIEF DESCRIPTION OF THE DRAWINGS

Embodiments according to the invention of a nozzle arrangement, a nozzle holder and a device for extruding dough materials will be explained in further detail in the following with the aid of schematic drawings, in which:

FIG. 4 is a side view of a second example of a baking article produced using the nozzle holder illustrated in FIG. 1, FIG. 5 is a cross section taken along line V—V in FIG. 4, and FIG. 6 is a longitudinal section through a second embodiment of a nozzle holder according to the invention.

DETAILED DESCRIPTION OF THE PREFERRED EMBODIMENTS

Figure 1:
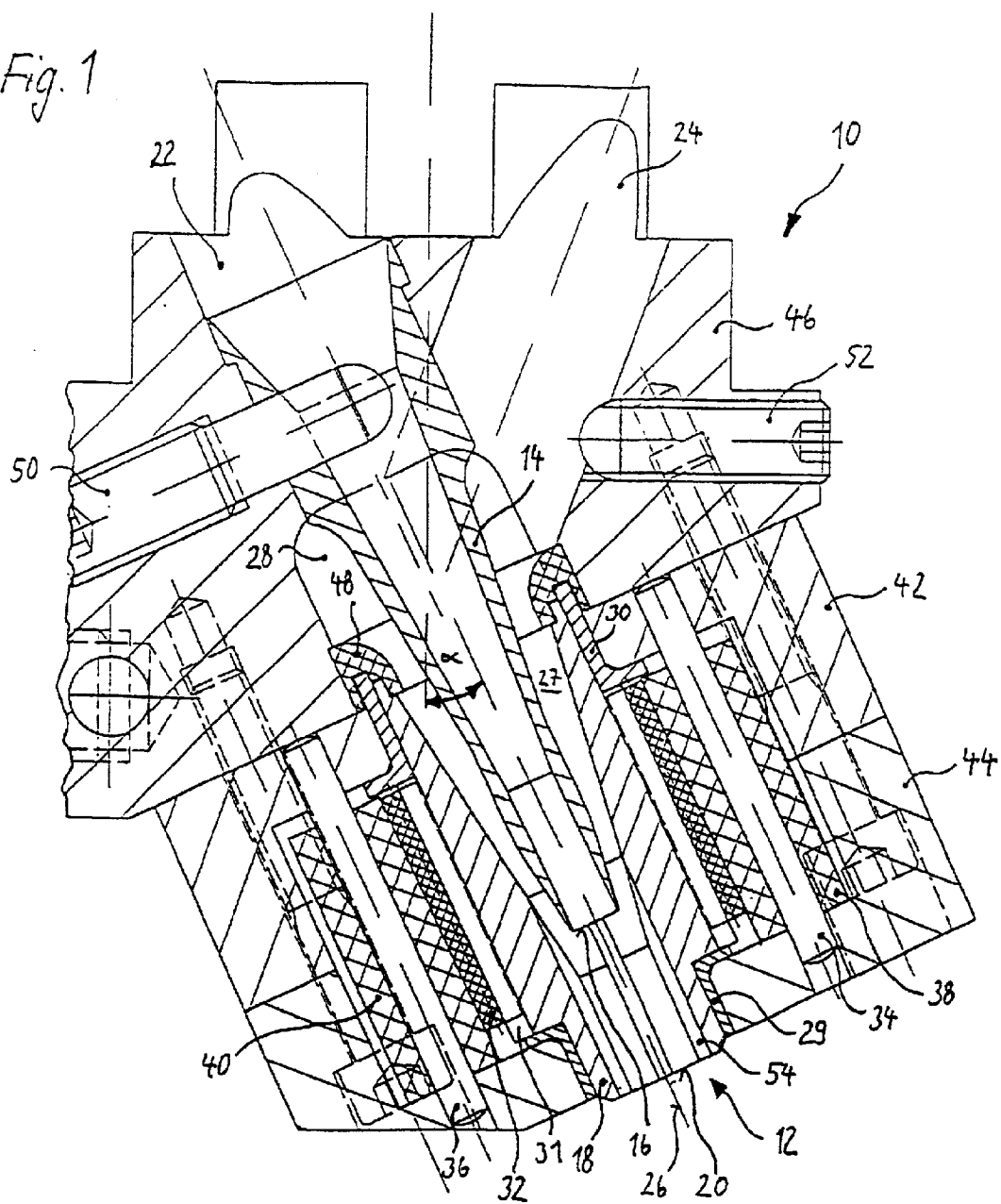
FIG. 1 is a longitudinal section through a first embodiment of a nozzle holder according to the invention.
Figure 2:
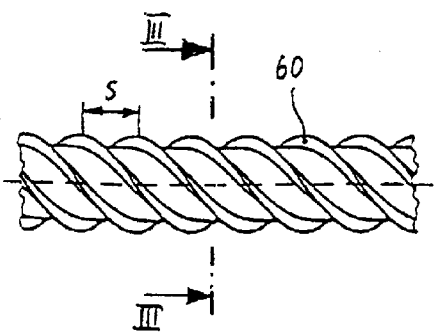
FIG. 2 is a side view of a first example of a baking article produced using the nozzle holder illustrated in FIG. 1.

FIG. 1 represents a first embodiment of a nozzle holder 10 with a nozzle arrangement 12, which comprises an inner nozzle 14 with a mouth 16 and an outer nozzle 18 with a mouth 20.

The end of the inner nozzle 14 opposite the mouth 16 adjoins an inner feed duct 22, through which an inner material or filling of a baking article which is to be manufactured can be supplied to the inner nozzle 14. Leading to the outer nozzle 18 is an outer feed duct 24. The inner nozzle 14 and the outer nozzle 18 have a common axis 26; in this respect, the outer nozzle 18 encloses the inner nozzle at a distance, so that an annular duct 27 is formed between the outer feed duct 24 and the mouth of the inner nozzle 14. The annular duct 27 is connected to the outer feed duct 24 by a radially enlarged annular chamber 28. An outer material can be introduced under pressure into the outer nozzle 18 through the outer feed duct 24 and the said annular chamber 28.

The materials are supplied through a device, not illustrated, for mixing and conveying the material. The materials may be a mixture for baking articles, such as flour, starch, eggs and sugar, for example, a mixture for confectionery, such as sugar, sweetener, cocoa and fat, or a fruit filling. The materials are converted into foodstuffs as a result of subsequent baking and cooling.

The outer nozzle 18 is rotatably mounted and axially secured in two sliding bearings 29 and 30. Constructed on the outer nozzle 18 is an outer toothing 31, by means of which the outer nozzle 18 can be driven by a motor, not illustrated, via a toothed belt 32 or another drive or traction means. The toothed belt 32 is supported by rollers 38 and 40 mounted in each case on a bolt 34, 36 respectively. The sliding bearings 29 and 30 and the bolts 34 and 36 are secured to housing sections 42 and 44, which are screwed to a housing section 46. In this manner, the outer nozzle 18 forms a rotor around the stationary inner nozzle 14, which together with the housing sections 42, 44, 46 forms a stator.

The intersection between the rotatable outer nozzle 18 and the stationary housing section 46 at the annular duct 28 is sealed by a seal 48, which overlaps the outer nozzle 18 on the inside in the direction of flow of the outer material.

The annular duct 28 and the seal 48 comprises rounded surfaces which are circular or elliptical in longitudinal section, so that the outer material flows in an almost turbulence-free manner. The flow cross sections of the inner feed duct 22 and of the outer feed duct 24 may be constructed in each case by adjustable bolts 50, 52 respectively.

The mouth 16 of the inner nozzle 14 is set back from the mouth 20 of the outer nozzle 18 in relation to the direction of flow of the materials. The outer nozzle 18 is circular cylindrical and on its inside comprises recesses 54 in the form of longitudinal grooves, of which three are illustrated.

During the extrusion of an inner and outer material through the inner feed duct 22 and the outer feed duct 24 respectively and through the annular duct 28 as well as the nozzles 14 and 18, the outer nozzle 18 is set in rotation by the toothed belt 32. Consequently, the materials flow together at the mouth 16. On the path from the mouth 16 to the mouth 20, the inner material is set in rotation by the outer material and is thereby compressed. Consequently, a secure bond is obtained between the inner and outer materials.

Baking articles are produced which—as illustrated in FIGS. 2 to 5—are formed by a cylindrical filling of inner material 56 and a casing of outer material 58 enclosing the filling. As a result of part of the outer material being pressed through the recesses 54, coiled webs 60 are formed on the circumference of the casing, the shape of the said webs 60 matching that of the grooves 54.

Figure 3:
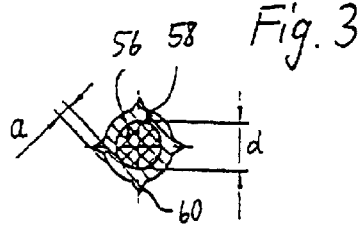
FIG. 3 is a cross section taken along line III—III in FIG. 2.

Baking articles are illustrated by way of example in FIG. 3 and FIG. 5 which are manufactured using four triangular or six hemispherical recesses in cross section. The pitch of the coiled webs 60 is dependent upon the flow velocity of the outer material 58 and the rotational velocity of the outer nozzle 18. Typical measurements for the diameter d of the cross section of the inner material 56 are 4 mm to 6 mm and for the layer thickness a of the casing of outer material 58 1 mm to 1.8 mm. The pitch s of the coiled webs 60 measures 6 mm to 12 mm, for example.

Alternatively, varicoloured materials, for example, may also be supplied to the outer nozzle 18, so that a marbled, coiled baking article is produced.

FIG. 6 illustrates a second embodiment of the nozzle arrangement 10, in which the rotor with the outer nozzle 18 can be driven by means of a toothed wheel gearing with crossing axes 26 and 62. To this end, a shaft 64 is rotatably mounted in the housing sections 42 and 44, the axis 62 of the shaft 64 extending at right angles to the axis 26 and at a distance therefrom. The shaft 62 comprises an outer toothing 66, which meshes with the outer toothing 31. Both toothings 31 and 66 form a helical gear pair, for example. Alternatively, the toothings 31 and 66 may be constructed as a bevel gear pair or worm gear set.

In the embodiments illustrated in FIGS. 1 and 6, a plurality of nozzle arrangements 10 may be arranged directly adjacent one another. In this respect, the axes 26 of the individual nozzle arrangements 10 are arranged parallel to one another and the individual rotors can be driven by means of a common toothed belt 32 or a common shaft 64.

As a result of the synchronous rotation of the nozzle arrangements 10, a plurality of like, coiled strands is produced simultaneously during extrusion, for example up to thirty strands. The strands are transported away from the nozzle arrangements 10 by means of a conveyor belt (not shown). In order to keep the deformation of the individual strands to a minimum during the transition onto the conveyor belt, the nozzle arrangement 10 as a whole is arranged inclined, i.e. the axis 26 of the nozzles 14 and 18 is inclined at an angle a of approximately 45° to the vertical.

What is claimed is:

1. A nozzle arrangement for extruding dough materials, with a stationary inner nozzle (14) with an axis (26) and a mouth (16) for extruding an inner material (56) and at least one outer nozzle (18) with a mouth (20) for extruding an outer material (58), the outer nozzle (18) being rotatable relative to the inner nozzle (14) about the axis (26) of the inner nozzle (14), characterised in that the mouth (20) of the outer nozzle (18) is arranged behind the mouth (16) of the inner nozzle (14) in the direction of flow in such a manner that the materials (56, 58) flow together at the mouth (16) of the inner nozzle (14), and the outer nozzle (18) is constructed on its inside in such a manner that, on the path to the mouth (20) of the outer nozzle (18), the inner material (56) is set in rotation by the outer material (58) and is thereby compressed.

2. A nozzle arrangement according to claim 1, characterised in that the outer nozzle (18) is substantially circular at its mouth (20) and on its inner wall comprises at least one substantially longitudinally oriented recess (54) for producing a coiled web (60) from the outer material (58).

3. A nozzle holder (10) for extruding dough materials with a stator, which supports an inner nozzle (14) with a mouth (16) for extruding an inner material (56), and in which an inner feed duct (22) leading to the inner nozzle (14) and an outer feed duct (24) are constructed, and with a rotor, which comprises an outer nozzle (18) with a mouth (20) for extruding an outer material (58) and is rotatably mounted in the stator, an annular chamber (28) being formed in the stator and/or rotor connecting the outer feed duct (24) with the outer nozzle (18), characterised in that the mouth (20) of the outer nozzle (18) is arranged behind the mouth (16) of the inner nozzle (14) in the direction of flow, so that the materials (56, 58) flow together at the mouth (16) of the inner nozzle (14), and the outer nozzle (18) is constructed on its inside in such a manner that, on the path to the mouth (20) of the outer nozzle (18), the inner material (56) is set in rotation by the outer material (58) and is thereby compressed.

4. A nozzle holder according to claim 3, characterised in that the outer nozzle (18) is integrally formed from the rotor.

5. A nozzle holder according to claim 3 or 4, characterised in that the rotor is sealed relative to the stator by a seal (48), which overlaps the rotor on the inside in the direction of flow of the outer material (58).

6. A device for extruding dough materials, characterised in that it comprises a nozzle holder according to claim 3 and the rotor is driven by a traction gearing, more particularly a toothed belt drive (31, 32), or a toothed wheel gearing (31, 64, 66) with crossing axes (26, 62) spaced apart from one another.

7. A device according to claim 6, characterised in that a plurality of nozzle holders (10) are arranged adjacent one another and is driven by a single traction gearing, more particularly a toothed belt drive (31, 32), or a single toothed wheel gearing (31, 64, 66) with crossing axes (26, 62) spaced apart from one another.

8. A device according to claim 6 or 7, characterised in that the nozzle holder(s) (10) is/are arranged inclined at an angle $\alpha$ of approximately 25° relative to the vertical.

* * * * *